Jan. 18, 1955 R. F. BRITTAIN 2,699,738
METHOD AND DEVICE FOR ROLLING PASTRY DOUGH
Filed Sept. 15, 1952
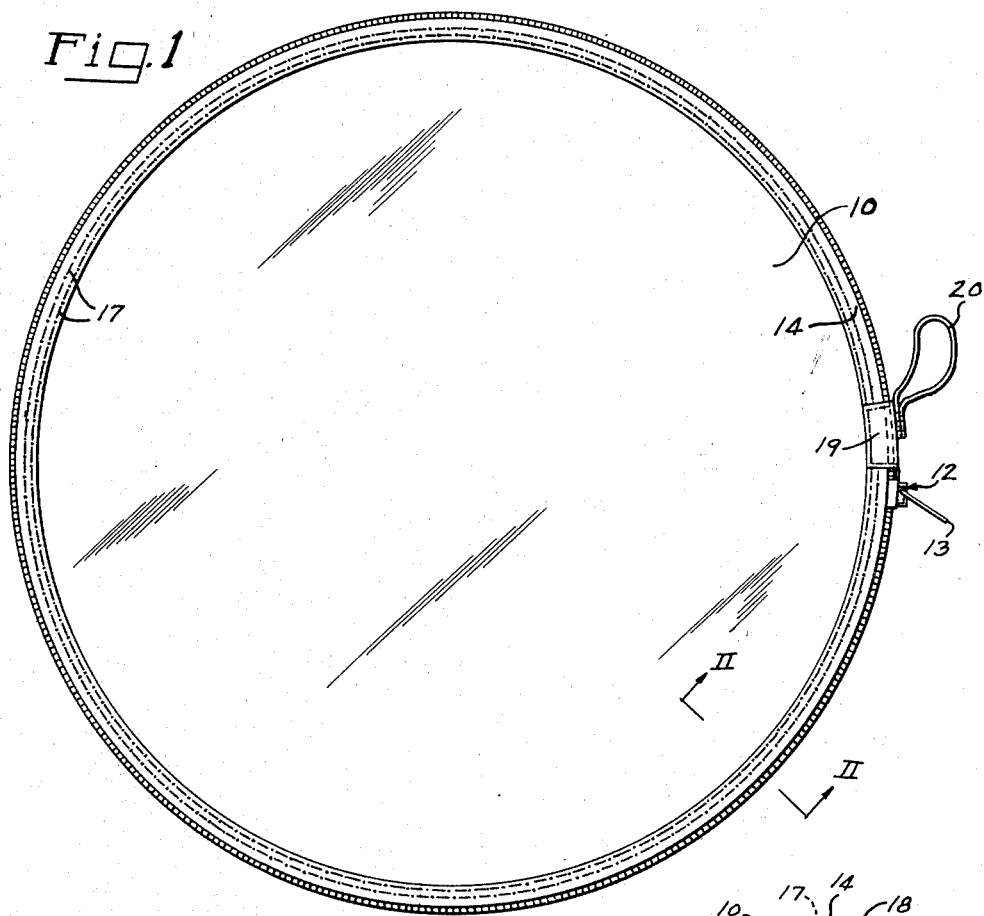
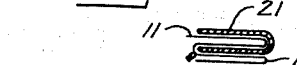
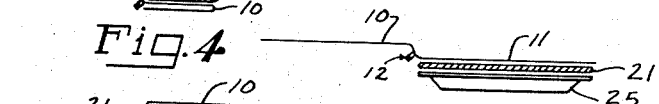
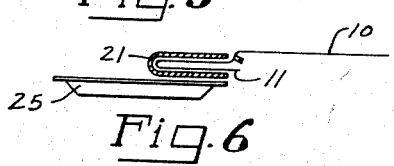
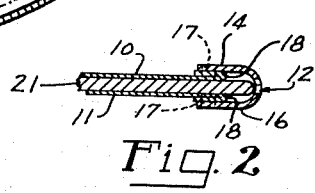
INVENTOR.
RACHEL F. BRITTAIN
BY
*Jennings & Carter*
ATTORNEYS

United States Patent Office 2,699,738
Patented Jan. 18, 1955

2,699,738

METHOD AND DEVICE FOR ROLLING PASTRY DOUGH

Rachel F. Brittain, Birmingham, Ala.

Application September 15, 1952, Serial No. 309,651

5 Claims. (Cl. 107—54)

This invention relates to a method and device for rolling pastry dough and has for an object the provision of a method and means whereby the pastry may be rolled and transferred to its proper position in a pie pan without the chances of the dough being broken.

Another object of my invention is to provide a device for rolling pastry dough embodying a closed receptacle in which the dough is rolled, thus keeping all of the dough within the confines of the receptacle without soiling the rolling pin or the surface on which the dough is rolled.

A further object of my invention is to provide a device of the character designated which shall be effective to shape the dough to the exact size for a pie pan, thus eliminating ragged edges to be cut off and wasted or re-rolled.

A still further object of my invention is to provide a device for rolling pastry dough and applying the same to a pie pan which shall be simple of construction, economical of manufacture and one which readily lends itself to mass production.

Briefly my improved device for rolling and applying pastry dough to a pie pan comprises a pair of superposed sheets of flexible material of a shape and size conforming to the shape and size of the pastry being baked. The outer edges of the sheets of material are detachably connected to each other by means of a slide-type fastener, thus permitting the dough to be conveniently removed from the device and applied to a pie pan without breaking. As is well known in the art to which my invention relates, breaking and re-rolling pastry dough destroys its flaky consistency.

A device illustrating features of my invention is shown in the accompanying drawing forming a part of this application in which:

Fig. 1 is a plan view of the device;

Fig. 2 is a sectional view taken along the line II—II of Fig. 1;

Figs. 3, 4, 5, 6 and 7 are diagrammatic views showing the steps employed in transferring dough from the device to a filled pie pan.

Referring now to the drawing for a better understanding of my invention, I show a pair of circular sheets of flexible material 10 and 11. The sheets are preferably formed of a transparent plastic material having a diameter equal substantially to the diameter of the pastry, such as a pie, being baked. For instance, when a 9 inch pie pan is to be employed the sheets of material 10 and 11 should be on the order of 11½ inches in diameter to provide ample dough for the sides and flanges of the pan. The advantage in employing a transparent plastic material is that one can see when the dough has reached all of the outer edges of the device. Also, plastic materials do not absorb liquid shortening and they are easily cleaned. The device is conveniently held in a fixed position by placing the same on a moist surface.

Surrounding the edges of the circular sheets of material is a slide-type fastener 12 having the usual operating handle 13 and side strips of tape 14 and 16. The strips of tape 14 and 16 are secured to the sheets of material 10 and 11 respectively as at 17 by any suitable means, such as by sewing. To increase the strength of the device and to provide a smooth outer surface, the edges of the sheets of material 10 and 11 are folded over as at 18.

The ends of the slide type fastener 12 are joined by a small strip of flexible material 19, which holds the two circular sheets of material together when the slide type fastener is moved to the open position. I have found in actual practice that where the ends of the fastener 12 are separated by a strip of material approximately ¾ inch in length the device is satisfactory. Secured to the strip of material 19 is a loop 20 which forms a handle for the device.

From the foregoing description, the operation of my improved device for rolling pastry dough will be readily understood. The slide type fastener 12 is moved to open position and the device is placed on a flat surface. The desired amount of dough 21 is placed adjacent the center of the device and the fastener 12 is moved to closed position. The dough is then rolled while in the device until it extends around the entire circumference. After the dough has been rolled to a uniform thickness, the fastener 12 is moved to open position and a pie pan is inverted on the dough. The slide fastener is moved to closed position, or left open if desired, and the pan is turned right side up. The device is then removed and the dough is pressed down into the pan in a manner well understood.

Referring to Figs. 3 to 7 I show diagrammatically the method of applying a top crust to a filled pie pan 25. The dough 21 is rolled in the manner described above and the upper sheet of material 10 is folded outwardly and overlapped, as shown in Fig. 3. The lower sheet of material 11 is then folded in half with the dough 21 lying on the outside thereof and placed on the folded sheet 10, as indicated in Fig. 4. Half of the folded dough lying on the sheet 11 is placed on the pie, as shown in Fig. 5. The upper sheet 10 is then removed, as shown in Fig. 6 and the remaining half of the dough is turned onto the pie, as shown in Fig. 7. The device is removed and the edges of the bottom and top crusts are joined in the usual manner.

From the foregoing it will be seen that I have devised an improved device for rolling pastry dough and applying the same to an empty or filled pie pan. In actual practice I have found that by providing a device which shapes the dough to the exact size of the vessel in which the pastry is being cooked, there is a saving of up to one fourth the ingredients employed in making the pastry. Also by providing a device which actually supports the dough until it is applied to the pie pan, I eliminate almost entirely the chances of the dough being torn or broken.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. The method of applying pastry dough cover to a filled pie pan, which consists of placing the pastry dough within a confined area defined between upper and lower sheets of flexible material, rolling the dough from the approximate center of said sheets outwardly in all directions to the outer edges thereof, removing said upper sheet, folding the lower sheet adjacent the center thereof away from the upper sheet with the pastry lying thereon and placing the same on said upper sheet, applying the exposed half of the folded dough to one half of the filled pie pan, and applying the other half of the dough to the remaining half of the filled pie pan.

2. In a device for use in the rolling of pastry dough and applying the same to a cooking vessel, superposed, smooth, impervious, flexible sheets defining between them a confined dough containing space of a shape and size conforming substantially to the shape and size of the pastry to be rolled, and means detachably connecting substantially the entire outer edges of said sheets to each other except for a small section thereof, permanently connected by a strip of flexible material.

3. In a device for use in the rolling of pastry dough and applying the same to a cooking vessel, a pair of superposed flexible sheets of smooth, impervious, transparent plastic material defining between them a confined dough containing space of a shape and size conforming substantially to the shape and size of the pastry to be rolled, and a slide-type fastener detachably connecting substantially the entire outer edges of said sheets except for a small section thereof, connected by a strip of flexible tape between and joining the ends of the slide fastener.

4. In a device for use in the rolling of pastry dough and placing the same in a cooking vessel, a pair of superposed, smooth, impervious sheets of flexible material of a nature adapted to adhere to a smooth moist surface and defining between them a confined dough containing space of a shape conforming to that of the pastry dough to be rolled, a slide type fastener detachably connecting substantially the entire outer edges of said sheets except for a small section thereof, connected by a strip of flexible tape between and joining the ends of the slide fastener.

5. The method of applying pastry dough to a cooking vessel which comprises the steps of placing the pastry dough within an enclosure defined between sheets of smooth impervious flexible material, placing the sheets upon a smooth moist surface, rolling said dough outwardly from the approximate center of said enclosure to the periphery thereof, and removing the dough from said enclosure and placing it in the cooking vessel.

References Cited in the file of this patent

UNITED STATES PATENTS

| Number | Name | Date |
|---|---|---|
| D. 159,471 | Chour | Aug. 1, 1950 |
| 396,779 | Stone | Jan. 29, 1889 |
| 1,705,149 | Brady | Mar. 12, 1929 |
| 2,026,476 | Lawson | Dec. 31, 1935 |
| 2,355,307 | Kors | Aug. 8, 1944 |
| 2,521,982 | Kors | Sept. 12, 1950 |
| 2,524,705 | Huseby | Oct. 3, 1950 |
| 2,557,279 | Greenberg | June 19, 1951 |
| 2,616,376 | Hammerstein | Nov. 4, 1952 |